Patented Mar. 7, 1933

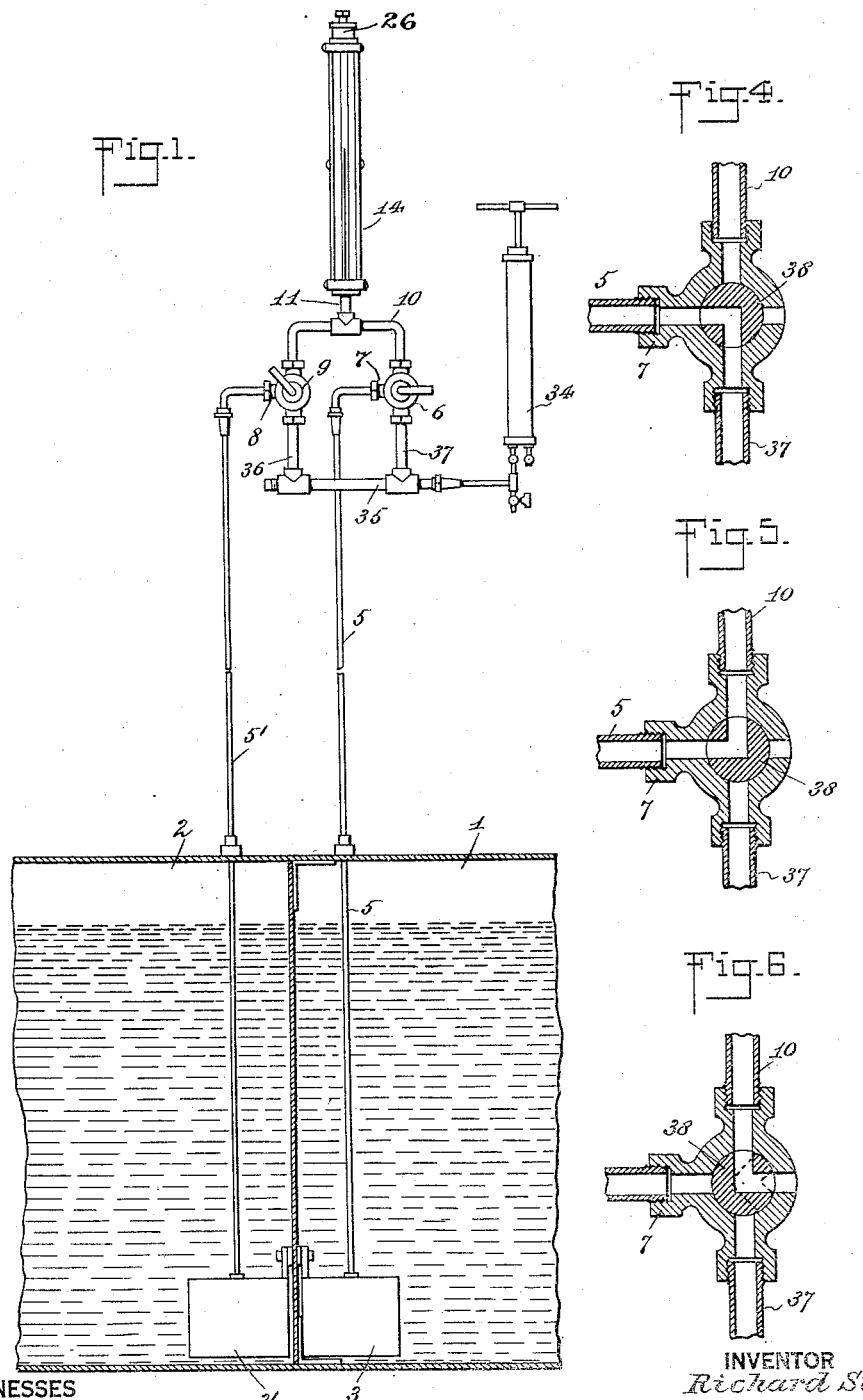

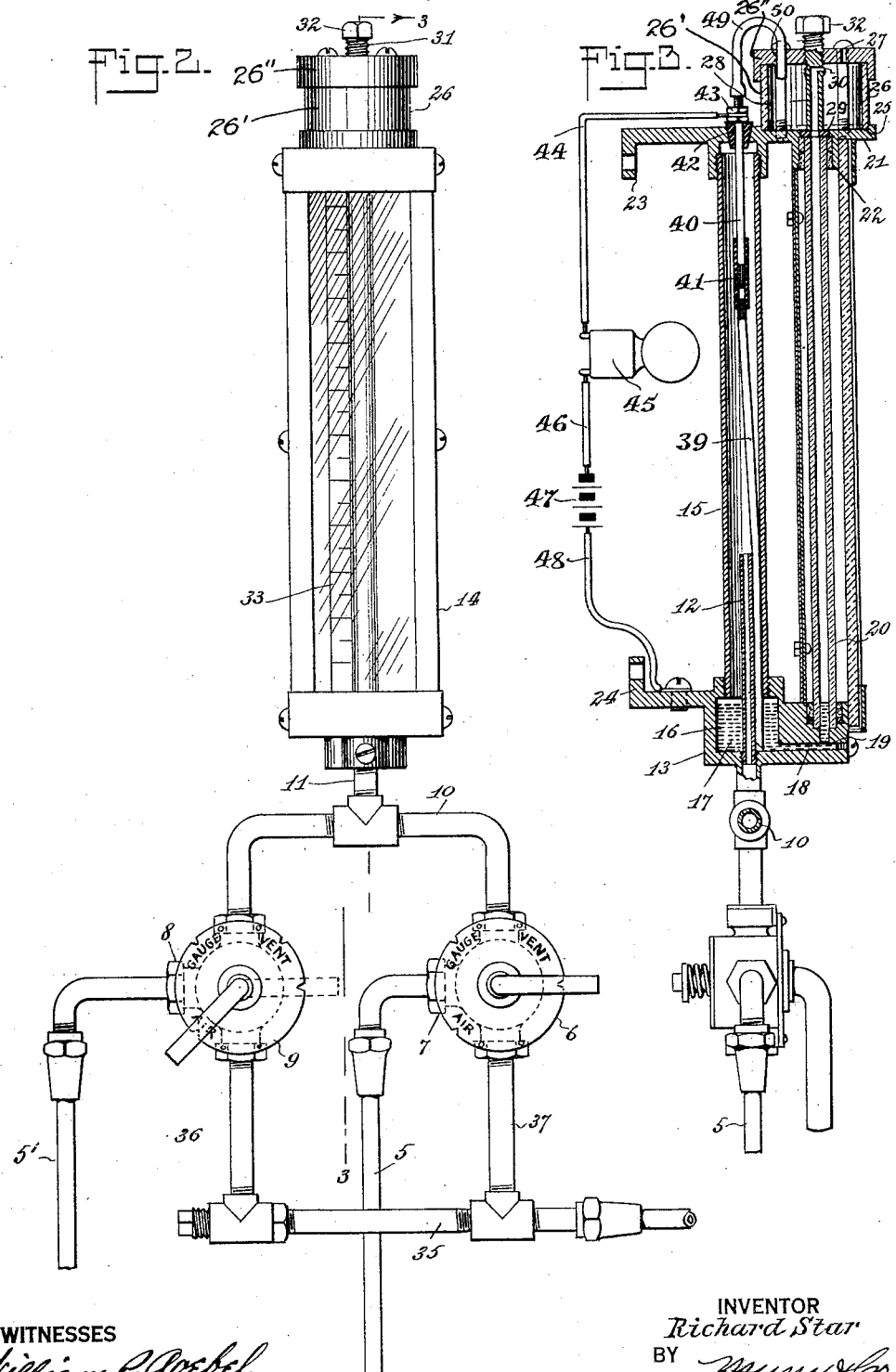

1,900,775

UNITED STATES PATENT OFFICE

RICHARD STAR, OF BROOKLYN, NEW YORK

TANK GAUGE

Application filed September 16, 1930. Serial No. 482,318.

This invention relates to tank gauges and has for an object to provide an improved construction wherein a single indicator may be used for gauging the level of oil in a plurality of tanks of the same depth.

Another object of the invention is to provide a gauge wherein by means of a pipe and valve system one pump and one gauge member may be used to accurately indicate the oil or water level in a plurality of tanks or containers.

In the accompanying drawings—

Figure 1 is a view partly in elevation and partly in section showing a complete gauge embodying the invention, part of the same being shown connected with two tanks;

Figure 2 is an enlarged front elevation of the gauge member, valves and associated parts shown in Figure 1;

Figure 3 is a sectional view through Figure 2 on the line 3—3;

Figure 4 is a vertical sectional view through one of the valves shown in Figure 2 when the same is set to admit air from the pump;

Figure 5 is a view similar to Figure 4 but showing the valve set to direct air from the airline to the gauge member;

Figure 6 is a view similar to Figure 4 but showing the valve set to vent air from the gauge member.

Referring to the drawings by numerals, 1 and 2 indicate tanks adapted to carry oil. In oil burning ships a double bottom is used for carrying oil and also a number of tanks are provided for carrying the oil, which oil is fed into the burners used in heating water to produce steam. In such ships it is desirable and really necessary for the engineer to know the level of oil in the various tanks, and consequently, various means have been provided heretofore to gauge the oil in any tank.

In the present invention means have been provided whereby the same gauge member may be used for one, two or more tanks to indicate the level of oil therein. As shown in Figure 1 the tank 1 is provided with a bell 3 which is hollow and which is in free communication with the airline 5, which airline is connected to valve 6 at the point 7.

With regard to tank 2 a bell 3' and an airline 5' are provided and preferably constructed identical with the same members associated with tank 1. The air line 5' is connected at point 8 with valve 9. Valves 8 and 9 are connected together by pipe 10 and midway of this pipe a pipe 11 is located, the same being in free communication with pipe 10 and with tube 12 (Fig. 3) which extends to the base 13 of the gauge member 14 and a point appreciably higher than the base, whereby air may be discharged freely into the compression pipe 15. It will be noted that air from either valve is adapted to discharged through pipes 10 and 11 into the tube 12.

Referring more particularly to Figure 3 it will be noted that the base 13 is provided with a mercury well 16 carrying a supply of mercury 17 which is adapted to flow through the passageway 18 and through the outlet 19 into the glass tube 20 which is carried by the base 13 and by a top plate 21. The top plate 21 is supplied with a tubular projection 22 for receiving the tube 20, and tube 20 is held in place by suitable packing not only in the top plate 21 but also in the base 13. The top plate 21 is provided with a bracket or extension 23 similar to the bracket or extension 24 on the base 13, whereby the device may be mounted on a wall or other support.

The top plate 21 is recessed at 25 so as to receive an inverted cup 26 having a vent 27. It will be noted that cup 26 is formed from a cylinder 26' preferably of glass and a top plate 26" preferably of metal. The tube 28 presses against a ring washer 29 so as to make a tight contact therewith ordinarily, said tube having an outlet 30 extending horizontally so that in case mercury is discharged out through the upper end of tube 20 it will pass into the tube or pipe 28 and out through the opening 30 into the cup 26. The upper end of the tube or pipe 28 is preferably solid and provided with external threads 31 which are screwed into the threaded aperture in the top plate 26".

Normally the parts are as shown in Fig. 3 but in case mercury should be discharged into the cup 26 for any reason the head 32 is actuated so that the tube or pipe 28 may be unscrewed sufficiently to allow the mercury to pass beneath pipe 28 and through the packing ring 29 into the tube 20. After this has been done the tube 28 is again screwed down until it presses the ring 29. The parts are then in condition for another test, if desired.

It will be noted that the tube 20 is of glass and that suitable graduations 33 are provided which would indicate the level of the oil in either tank 1 or 2 according to which one is being tested. It will be understood that during a test, air is discharged from pipe 5 and that said air will act on the mercury 17 so as to cause the same to flow through the passageway 18 and into tube 20 in proportion to the pressure of the air. In order to secure this air pressure and to gauge either of the tanks an air pump 34 is provided which supplies air to either of the pipes 5 and 5' according to the position of the respective valves 6 or 9.

In operation when it is desired to ascertain the level of the oil in tank 2, valve 9 is shifted to the position shown in Figures 2 and 4. The pump 3 is then actuated whereby air will be supplied to the supply line 35 and from thence through pipes 36 and 37 to valves 6 and 9. As valve 6 is in the dotted position shown in Figure 6 air cannot pass from pipe 37, but when valve 9 is in the position shown in Figures 2 and 4 air may pass through the valve into the airline 5', and from thence through pipe 4' to bell 3'. The engineer or other person operating the pump 34 continues to operate the pump until all of the oil has been forced out of the bell 3' and air begins to pass therefrom.

When this occurs the air pressure in the line 5' will be equal to the pressure of the oil. As soon as this happens the pumping is stopped and valve 9 turned to the gauging position, namely, to the position shown in Fig. 5. When this occurs the air in airline 5' and associated parts will quickly rush through pipes 10 and 11 into the small pipe 12 and from thence into the compression pipe 15. This will permit the air to act on the mercury 17 to force the same through passageway 18 and thence into tube 20. The rise of mercury in the tube 20 indicates the level of oil in the tank 2, it being understood, of course, that the graduations 33 are properly calibrated to show the desired result.

At the same time that mercury is forced through the passage 18 and upwardly through the tube 20, it is also forced upwardly in the pipe 39 which may be of metal or other desired material. This pipe is connected to a metal pipe 40 by an insulating sleeve 41. Preferably this sleeve 41 is screwed on to pipe 39 and slidingly fitted on to pipe 40 so that pipe 40 may be slid upwardly and downwardly so as to adjust the height thereof. Pipe 40 extends through a suitable insulated packing or plug 42 fitted tightly in plate 21 whereby no air can pass through. A pair of nuts 43 are screwed on to pipe 40 to clamp the end of a wire 44. Wire 44 extends from one terminal to a bell or other electrical alarm device 45, while the other terminal of the bell 45 is connected by a conductor 46 to a source of current 47. The source of current 47 is grounded through wire 48 so that whenever mercury is forced upwardly in pipe 39 until it contacts with pipe 40 the bell 45 will be sounded as the circuit thereof is closed. In order to prevent accidental loss of mercury in case of too much air pressure a flexible hose 49 is forced over the end of pipe 40 and extends downwardly through a suitable opening 50 into the cup 26. In this way the tube 20 will indicate the level of oil in the tank and the signal device or bell 45 will be sounded when the tank has been filled to a desired extent, for instance, 95% full. By moving the pipe 40 upwardly or downwardly the tank may be filled to a greater or less extent before the bell 45 will be sounded. The sounding of the bell 45 does not in any way affect the gauge 20 but is a signal for the workmen to turn off the in-flowing oil when the tank is being filled. After the tank has been filled and partly used the bell 45 is, of course, noneffective and is adapted to be effective only during the filling operation. The gauge 20 is effective at all times and is adapted to truly indicate the level of oil or other liquid in the tank.

After this test the valve 9 is moved to the position shown in Figure 6, whereupon pipes 10 and 11, 12 and 15 are vented. When this occurs the mercury 17 will naturally flow back and assume substantially the position shown in Figure 3. After this has been done the valve 9 is moved to the dotted position shown in Figure 2, whereupon the passageway in the key or core 38 is out of communication with any of the inlets or outlets in the valve casing.

Valve 6 is then turned to the position marked Air in Figure 2, which is the position shown in Figure 4. The pump 34 is then operated and air will be forced through pipes 35 and 37 and valve 6 into the airline 5. Air is caused to flow in this way until it begins to bubble or escape from the bell 3. This will indicate that the pressure in airline 5 and associated parts is the same as the pressure of oil in the tank 1. As soon as this takes place valve 6 is turned to the position marked Gauge in Figure 2, which is the position shown in Figure 5. Air from line 5 and associated parts will then quickly flow through pipes 10, 11 and 12 into the compression pipe 15, whereupon some of the mercury 17 will again be forced through the passageway 18 to indicate in tube 20 the level of oil in tank 1.

At the same time that the mercury passes into the tube 20 it also passes into the pipe 39. If this is merely a test as to the level of oil in the tank after some oil has been used, the mercury will not rise to a point in contact with the metal pipe 40. Consequently, the rise of mercury in pipe 39 will be non-effective, although the rise of mercury in tube 20 will accurately indicate the level of oil in the tank.

After this has been done valve 6 is moved to the position marked Vent, as shown in Figure 2. If there should be more than two tanks to be gauged valve 6 will be moved to the dotted position shown in Figure 2 and the third, fourth or other tanks gauged in the same manner just described, there being provided a valve for each tank, an airline for each tank, and a pipe 10 connected to all the valves. It will thus be seen that one gauge member 14 and one pump 34 may be used with a plurality of tanks to secure an accurate reading showing the level of the oil therein.

Also, by the construction set forth only one valve in the airline is needed for each tank. Ordinarily when about to test one or more tanks the various valves 6 and 9 and the other smaller valves are turned to what may be termed the inoperative position or station, namely, the dotted position shown in Figure 2. In this way no air can pass in any direction through the valves so that air will pass only through the valves when properly set.

When the valve is moved to the inoperative station, air cannot pass therethrough in any direction. If both valves are set at the inoperative position or station and it is desired to ascertain the level of oil in one of the tanks, the valve associated with the particular tank to be tested is moved to the air position or station indicated at the left in Figure 2 of the drawings. The pump is then operated until the entire air system has been properly filled with air and the oil expelled from the bell 3'. After the oil has been expelled from the bell 3', the valve 9 is turned to the gauge station and in doing so, the pump will be turned off of the air system, and the air system turned on to the gauge, so that the air from the air system will enter the gauge and cause the same to function. After this has been done, the valve is turned to the vent station and the air in the air system and gauge is vented to the air, after which the valve is turned to the inoperative position or station as shown in dotted lines at the left of Figure 2.

Referring again to the cup 26 it will be noted that the cylinder 26' is formed of clear glass. This is important as it permits the operator to see when the mercury has been discharged from the cup. Occasionally it occurs that the engineer or other operator does not know that some of the mercury has been discharged from the cup and, consequently, where the cup is opaque the operator does not know definitely whether or not there is any mercury in the cup. By having the cylinder of the cup clear glass the operator may readily see if there is any mercury in the cup and the quantity therein. The presence of mercury in the cup will cause the operator to adjust the device and allow the mercury to flow back into the base so that another reading may be taken if the matter is important.

I claim:—

A gauge structure for a pair of tanks comprising a pressure responsive gauge member and an air supply pump, a continuous tubular structure formed with a top section, a bottom section and two side sections connecting the top and bottom sections, a valve interposed in each of the two side sections, means for connecting the top section to said gauge member, and means connecting said pump to said bottom section, each of said valves having an air inlet station, a gauge station, a vent station and an inoperative station, and an air system for each valve extending from said gauge station to a point near the bottom of the respective tank whereby either of said valves may be moved to an inoperative or dead station, while the other valve is caused to direct air to said indicating means for actuating the same with either of said tanks for indicating the level of oil therein.

Signed at New York city, in the county of New York and State of New York, this 11th day of September, 1930.

RICHARD STAR.